United States Patent
Caballero et al.

(10) Patent No.: US 12,128,517 B2
(45) Date of Patent: Oct. 29, 2024

(54) AUTOMATIC DISPENSING DEVICE

(71) Applicant: Reckitt & Colman (Overseas) Hygiene Home Limited, Slough (GB)

(72) Inventors: Moises Caballero, Barcelona (ES); Andrew Johnson, Hull (GB); Sergio Luque, Barcelona (ES)

(73) Assignee: Reckitt & Colman (Overseas) Hygiene Home Limited, Slough (GB)

(*) Notice: Subject to any disclaimer, the term of this patent is extended or adjusted under 35 U.S.C. 154(b) by 168 days.

(21) Appl. No.: 17/776,697

(22) PCT Filed: Dec. 4, 2020

(86) PCT No.: PCT/GB2020/053111
§ 371 (c)(1),
(2) Date: May 13, 2022

(87) PCT Pub. No.: WO2021/111146
PCT Pub. Date: Jun. 10, 2021

(65) Prior Publication Data
US 2022/0395946 A1  Dec. 15, 2022

(30) Foreign Application Priority Data
Dec. 5, 2019 (GB) .................................. 1917820

(51) Int. Cl.
*B23Q 3/154* (2006.01)
*H01F 7/04* (2006.01)
*H01F 7/20* (2006.01)

(52) U.S. Cl.
CPC ............. *B23Q 3/1546* (2013.01); *H01F 7/04* (2013.01); *H01F 2007/208* (2013.01)

(58) Field of Classification Search
CPC ... B23Q 3/1546; H01F 7/04; H01F 2007/208; H02K 21/24; F04D 29/282;
(Continued)

(56) References Cited

U.S. PATENT DOCUMENTS 5,903,118 A * 5/1999 Miekka .................... H02K 3/18
   318/400.41
10,454,357 B1  10/2019 Pandya
(Continued)

FOREIGN PATENT DOCUMENTS

CN    101363444 A    2/2009
DE    102008049757 A1    4/2010
(Continued)

OTHER PUBLICATIONS

International Search Report and Written Opinion of the International Searching Authority for corresponding application PCT/GB2020/053111 dated Mar. 15, 2021.
(Continued)

*Primary Examiner* — Mohamad A Musleh
(74) *Attorney, Agent, or Firm* — Norris Mclaughlin PA

(57) ABSTRACT

An automatic dispensing device for dispensing a volatile substance, the device comprising:
  a fan configured to generate airflow and dispense the volatile substance from the device;
  a drive apparatus having at least one electromagnetic coil connectable to a drive circuit;
  wherein the fan comprises at least one magnet located along an arc of the fan and the electromagnetic coil is configured to attract or repel the at least one magnet;
  wherein the drive circuit is configured to switch the current direction in the electromagnetic coil to sequentially attract and then repel the at least one magnet as the fan rotates.

16 Claims, 5 Drawing Sheets

(58) Field of Classification Search
CPC ............... F04D 25/0673; F04D 29/705; F04D 25/0653; A01M 1/2033; A61L 9/122
See application file for complete search history.

(56) References Cited

U.S. PATENT DOCUMENTS

| | | |
|---|---|---|
| 10,461,673 B2 | 10/2019 | Leman et al. |
| 2004/0250962 A1 | 12/2004 | Hart |
| 2019/0149002 A1 | 5/2019 | Kim et al. |

FOREIGN PATENT DOCUMENTS

| | | | | |
|---|---|---|---|---|
| EP | 3214314 A1 | | 9/2017 | |
| GB | 2551364 A | * | 12/2017 | ........... H02K 1/2793 |
| JP | 2001328726 A | | 11/2001 | |
| JP | 2015 012795 A | | 1/2015 | |
| JP | 2015104593 A | | 6/2015 | |
| JP | 2051104593 A | | 6/2015 | |
| WO | 2006/011626 A1 | | 2/2006 | |

OTHER PUBLICATIONS

EP Examination Report for corresponding application EP 20 825 205.6 dated Mar. 20, 2024.
GB Search Report for corresponding application GB 1917820.1 dated Jun. 5, 2020.

* cited by examiner

AUTOMATIC DISPENSING DEVICE

The present disclosure relates to an automatic dispensing device, and more particularly, to a device for dispensing volatile substances. The volatile substance may include air freshener and insecticides.

In general, the rate at which automatic dispensing devices emit volatile substances can be altered by changing the airflow. For example, a motion of a fan element can be used to increase the flow of volatile substances and increase distribution of the volatile substance. It is also beneficial to increase airflow away from the dispensing device so that the volatile substance is distributed more widely and further from the dispensing device.

The increase airflow can be energy intensive. Effective distribution of a volatile substance can lead to high battery capacity requirement this can lead to difficulty using renewable energy as a provision of power. The device described in the present disclosure provides a more efficient driving mechanism to generate airflow that allows volatile substances to be distributed using a lower energy requirement.

Aspects of the disclosure are also described in detail, by way of example only, with reference to the accompanying drawings, in which.

Figure 1:
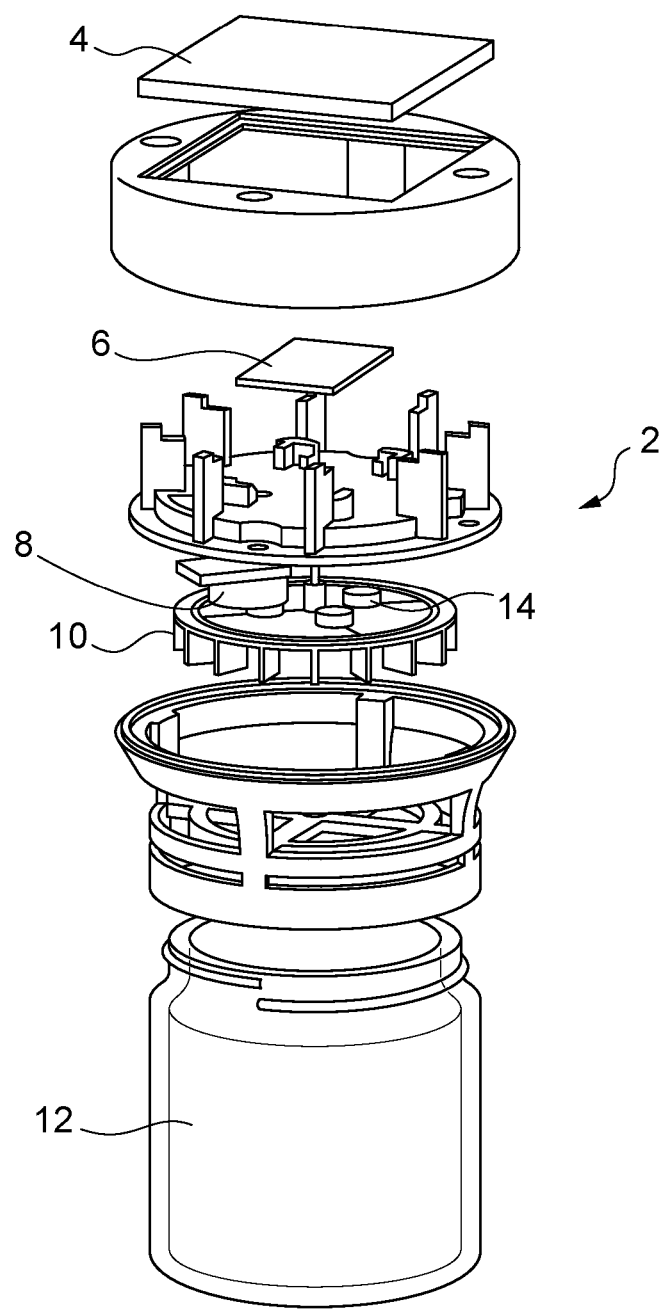
FIG. 1 shows a schematic illustration of an automatic dispensing device.

FIG. 1 show an example of an automatic dispensing device 2. The automatic dispensing device 2 of FIG. 1 comprises a solar panel 4, a drive circuit 6, an electromagnet 8, a fan 10, at least one magnet 14 and a reservoir 12 containing a volatile substance.

The solar panel 4 is coupled to the drive circuit 6 which is connected to the electromagnet 8. The fan 10 is coupled to the at least one magnet 14. The fan 10 is located proximate to the electromagnet 8 so that the magnetic field generated by the electromagnet is sufficiently strong to attract or repel the at least one magnet 14. The fan 10 is located proximate to the reservoir 12 so that the fan increases airflow and distribution of the volatile substance is increased.

In the example illustrated in FIG. 1, the drive circuit is configured to receive power from the solar panel 4. The power received by the from the solar panel may be stored by the drive circuit using, for example, a battery. The power received from the solar panel 4 is used to drive the electromagnet 8 and the current driven through the electromagnet generates a magnetic field. The magnetic field can be altered by varying the magnitude and direction of the current. For example, the poles of the electromagnet 8 may be switched by changing the direction of the current.

Figure 2:
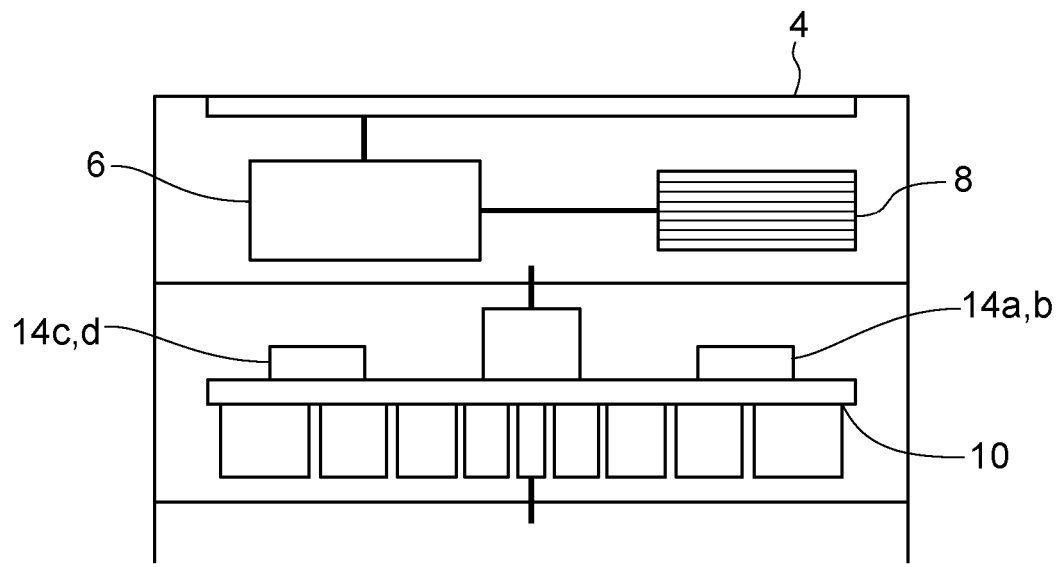
FIG. 2 shows an illustration of the components of the automatic dispensing device of FIG. 1.
Figure 3:
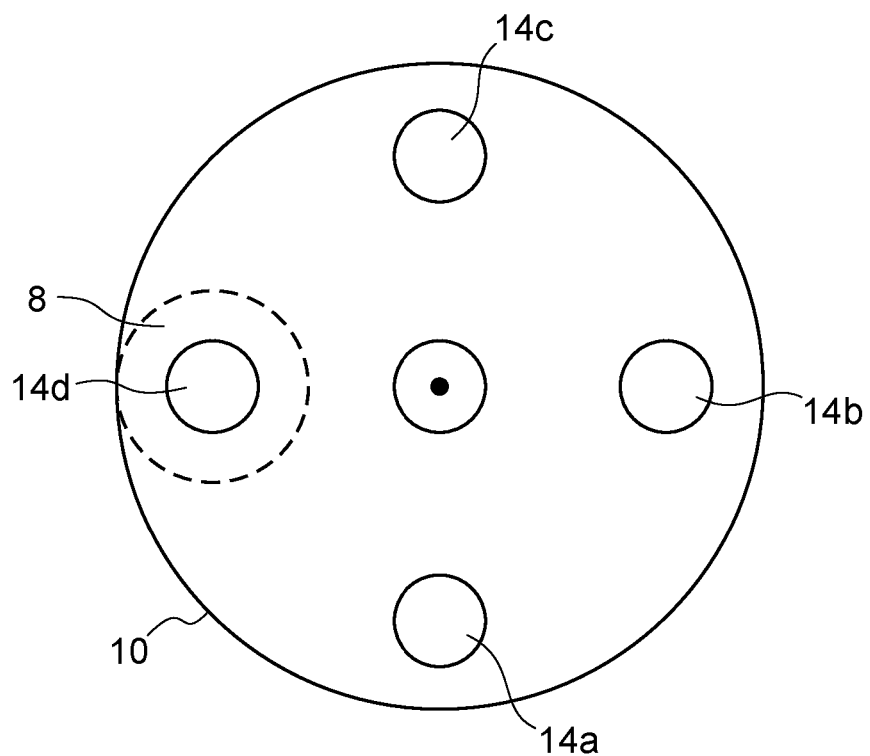
FIG. 3 is a top view of the automatic dispensing device showing the fan and drive mechanism.

FIG. 2 show an example of a drive mechanism that may be used with the device of FIG. 1. The illustration in FIG. 2 shows the solar panel 4 connected to the drive circuit 6 which in turn is connected to the electromagnet 8. In the example illustrated in FIG. 2, the electromagnet 8 is positioned above the one of the at least one magnet 14 that is attached to the fan 10. In the example illustrated in FIG. 2 there are 4 magnets 14a, b, c, d attached to the fan. FIG. 3 shows a top view of the drive mechanism of FIG. 2. This top view shows the relative position of the electromagnet 8, the magnets 14a, b, c, d and fan 10. In the example illustrated in FIGS. 2 and 3, the magnets on the fan are located at equidistance from one another i.e. located at 90-degree intervals on the top surface of the fan. In this example, the pole of each magnet is oriented in the same direction. For example, north-north-north-north or south-south-south-south.

Figure 4:
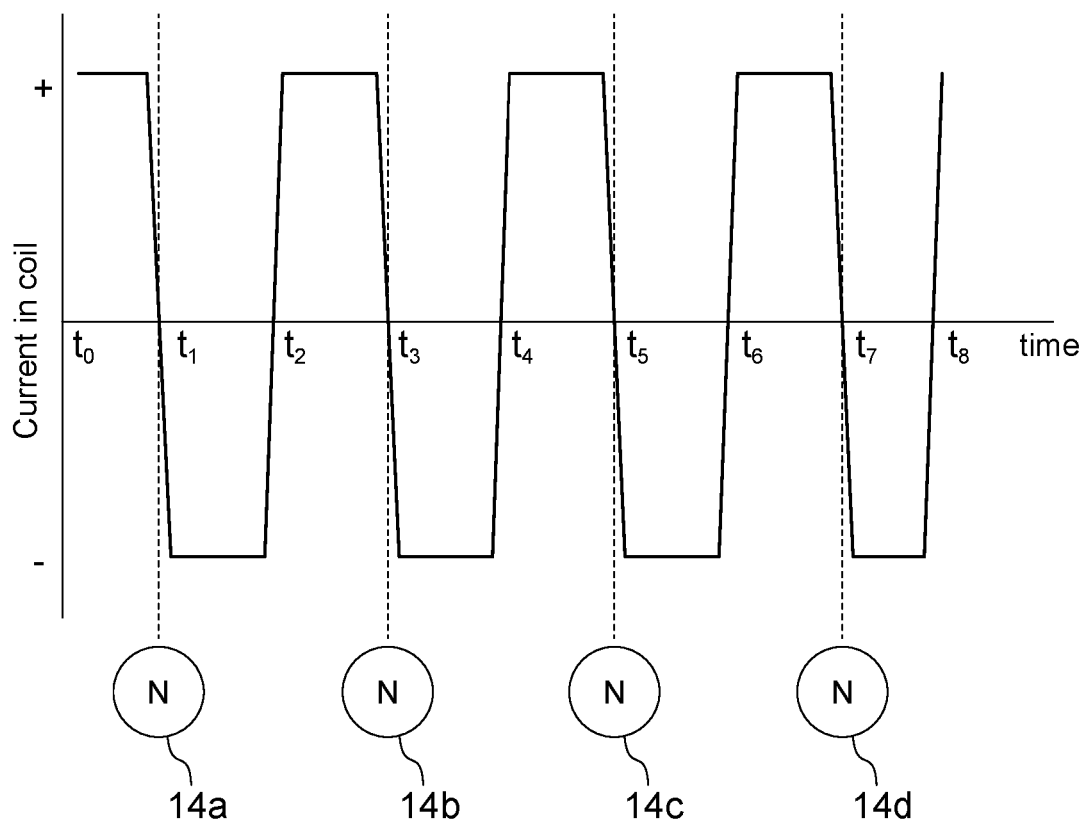
FIG. 4 shows an example of how the current is varied through an electromagnet to drive the fan of the automatic dispensing device.

FIG. 4 shows a graphical illustration how the current may be varied through the electromagnet 8 and the position of the four magnets relative to the electromagnet in time. As illustrated, the current in the electromagnet is varied in time and switches from a positive current to a negative current or from a negative current to a positive current as each magnet 14a, b, c, d passes the electromagnet and when equidistance between two magnets e.g. equidistance from magnet 14a and magnet 14b.

In this example, in order to generate the north pole and south pole from the electromagnet, the electromagnet comprises a coil that is wound such that a positive current generates a south pole and a negative current generates a north pole. The electromagnet is positioned proximate the magnets so that the magnetic energy is converted to kinetic energy in the fan via the magnetic interaction between the electromagnet 8 and the magnets 14a, b, c, d.

As shown in FIG. 4, at time $t_0$ the electromagnet has a positive current and attracts magnet 14a. At time $t_1$ the magnet 14a passes the coil. The current through the electromagnet is switched to a negative current so that the electromagnet repels magnet 14a. At time $t_2$, the electromagnet is equidistance from magnet 14a and magnet 14b and the current in the electromagnet switches from negative to positive so that magnet 14b is attracted to the electromagnet. At time $t_3$ the magnet 14b passes the coil. The current through the electromagnet is switched to a negative current so that the electromagnet repels magnet 14b. At time $t_4$, the electromagnet is equidistance from magnet 14b and magnet 14c and the current in the electromagnet switches from negative to positive so that magnet 14c is attracted to the electromagnet. At time $t_5$ the magnet 14c passes the coil. The current through the electromagnet is switched to a negative current so that the electromagnet repels magnet 14c. At time $t_6$, the electromagnet is equidistance from magnet 14c and magnet 14d and the current in the electromagnet switches from negative to positive so that magnet 14d is attracted to the electromagnet. At time t7 the magnet 14d passes the coil. The current through the electromagnet is switched to a negative current so that the electromagnet repels magnet 14d. At time $t_8$, the electromagnet is equidistance from magnet 14d and magnet 14a and the current in the electromagnet switches from negative to positive so that magnet 14a is attracted to the electromagnet.

The switching of the current in the electromagnet described above provides an efficient mechanism of transferring the electrical energy to kinetic energy in the fan using the magnetic attraction and repulsion between the electromagnet 8 and the magnets 14 coupled to the fan 10.

The circuit may be selected to provide an oscillating current on the electromagnet. In the example illustrated above the electromagnet comprises a single coil and the circuit selected in order to provide an oscillating current. The circuit may, for example, be a Schmitt trigger that provides an oscillating current to the coil. In other examples, a physical switch may be used to switch the current direction. In a further example, a logic integrated circuit (IC) may be used.

In another example, the electromagnet comprises a first coil 8a and a second coil 8b. The first coil 8a is located proximate to the second coil 8b. In this example, the fan is driven by the electromagnetic by applying a current in one direction through the first coil 8a and applying a current in the opposite direction in the second coil 8b. This results in the first coil 8a having a magnetic pole direction in the opposite direct to the magnetic pole from the second coil 8b.

Figure 5:
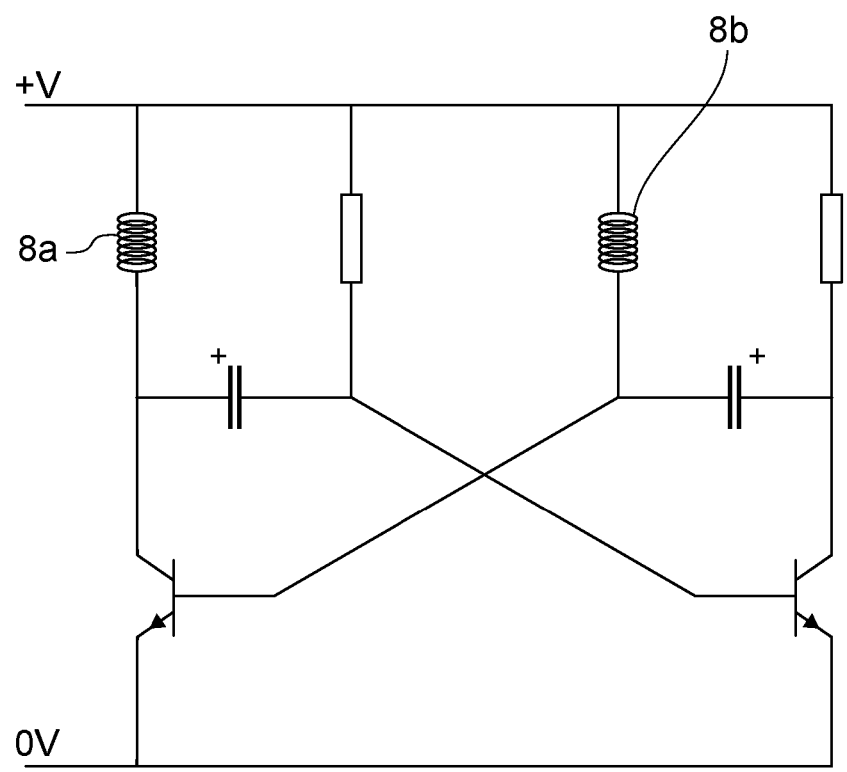
FIG. 5 is an example of a circuit that may be used to drive the fan element of the automatic dispensing device.

FIG. 5 shows an example of a circuit that may be used to provide a current that oscillate between passing current through first coil 8a and second coil 8b. In this example, the first coil 8a and second coil 8b are connected in the circuit so that the direction of the current in the first coil 8a is in the opposite direction to the current in the second coil 8b.

In the example described above the fan comprises four magnets 14. In other examples the fan may comprise a different number of magnets 14. For example, the fan may comprise 2, 3, 4, 6, 7 or 8 magnets. The number of magnets 14 may depend upon the size of the fan 10, for example it may be beneficial to use a greater number of magnets 14 for a larger fan 10.

Figure 6:
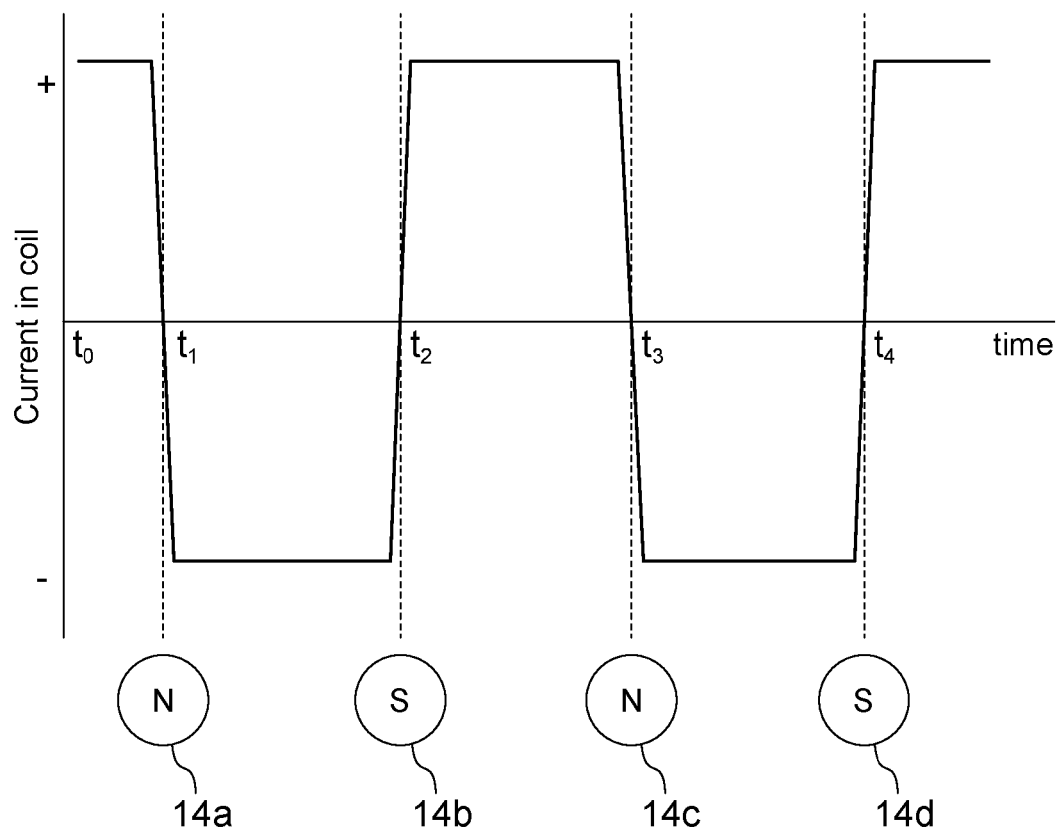
FIG. 6 shows a further example of how the current is varied through an electromagnet to drive the fan of the automatic dispensing device.

FIG. 6 represents an alternative arrangement where the poles of the magnets alternate. In this example, the pole of the magnet would be oriented so that the pole of each magnet facing the top surface alternates along the arc of fan i.e. successive magnets in a clockwise direction on the fan would have their poles in opposite directions. In the example where 4 magnets are located on the fan, the magnets are arranged to be north-south-north-south.

The graphical representation shows how the current may be varied through the electromagnet 8 and the position of the four magnets relative to the electromagnet in time. As illustrated, the current in the electromagnet is varied in time and switches from a positive current to a negative current or from a negative current to a positive current as each magnet 14a, b, c, d passes the electromagnet. In this example, in order to generate the north pole and south pole from the electromagnet, the electromagnet comprises a coil that is wound such that a positive current generates a south pole and a negative current generates a north pole. The electromagnet is positioned proximate the magnets so that the magnetic energy is converted to kinetic energy in the fan via the magnetic interaction between the electromagnet 8 and the magnets 14a, b, c, d.

As shown in FIG. 6, at time $t_0$ the electromagnet has a positive current and attracts magnet 14a. At time $t_1$ the magnet 14a passes the coil. The current through the electromagnet is switched to a negative current so that the electromagnet repels magnet 14a and attracts magnet 14b. At time $t_2$, the electromagnet is switched to a positive current to repel magnet 14b and attract magnet 14c. At time $t_3$, the current in the electromagnet is once again reversed to be negative and repels magnet 14c and attracts magnet 14d. At time $t_4$, the current in the electromagnet is switched to be positive to repel magnet 14d and attract magnet 14a.

In the example above the magnet 14 is a neodymium magnet. In other examples, the one or more magnet may be a ferrite magnet and/or other rare earth magnet.

The electromagnet may be a coil made from copper, for example enamelled copper coil wire. In an example, the copper wire may have a thickness between 0.04 and 0.05 mm. In an example, the electromagnet may have between 1000 and 8000 turns on the coil, for example 2000 to 7000 turns, for example 3000 to 6000 turns, for example 4000 to 5000 turns.

In the example above, the automatic dispensing device comprises a solar panel. In other examples, the dispensing device may be powered from a power storage unit (e.g. battery power) and/or connected to an external electricity supply (e.g. mains power).

In the examples described above, the electromagnet 8 interacts with at least one magnet 14 coupled to the fan 10. The electromagnet 8 may also interact with at least one magnet 14 coupled to a paddle or stirrer that is configured to move within the volatile substance to generate a current in the volatile substance.

Further modifications and developments can be made without departing from the scope of the invention described herein.

The invention claimed is:

1. An automatic dispensing device operable in dispensing a volatile substance, the device comprising:
   a fan configured to generate airflow and dispense the volatile substance from the device;
   a drive apparatus having at least one electromagnetic coil connected to a drive circuit;
   wherein the fan comprises at least one magnet located along an arc of the fan and the electromagnetic coil is configured to attract or repel the at least one magnet;
   wherein the drive circuit is configured to switch the current direction in the electromagnetic coil to sequentially attract and then repel the at least one magnet as the fan rotates.

2. The device of claim 1, wherein the at least one magnet comprises two or more magnets.

3. The device of claim 2, wherein each of the two or more magnets comprises a magnetic pole, and the magnetic pole of each magnet is orientated in a same direction.

4. The device of claim 3, wherein the drive circuit is configured to switch the direction of the current as each magnet passes the electromagnet and also when the electromagnet is equidistant between two adjacent magnets.

5. The device of claim 1, wherein the drive apparatus wherein the electromagnetic coil comprises a first electromagnetic coil and a second electromagnetic coil and the first electromagnetic coil and the second electromagnetic coil are located proximate to one another.

6. The device of claim 5, wherein the drive circuit that sequentially passes current through the first electromagnetic coil and then through the second electromagnetic coil.

7. The device of claim 5 wherein the at least one magnet comprises two or more magnets, each having a magnetic pole, and where the magnetic pole of each magnet is orientated in a same direction.

8. The device of claim 5, wherein the drive circuit is configured such that a current passed in the first electromagnetic coil generates a magnetic pole in the opposite direction to the magnetic pole from generated by passing current in the second electromagnetic coil.

9. The device of claim 7, wherein the drive circuit switches the current between the first electromagnetic coil and the second electromagnetic coil when each magnet passes the first electromagnetic coil and the second electromagnetic coil and also when the first electromagnetic coil and second electromagnetic coil are equidistant between two adjacent magnets.

10. The device of claim 5, wherein the first electromagnetic coil and the second electromagnetic coil are positioned coaxially.

11. The device of claim 5, wherein the driving circuit comprises an astable multivibrator circuit.

12. The device of claim 1, wherein the at least one magnet comprises a neodymium magnet.

13. The device of claim 2, which comprises four magnets located at 90-degree intervals on the fan.

14. The device of claim 1, wherein the drive apparatus is configured to receive power from a solar panel.

15. The device of claim 5, wherein the at least one magnet comprises a neodymium magnet.

16. The device of claim 1, which further comprises:
a reservoir containing a volatile substance.

\* \* \* \* \*